Nov. 5, 1963  F. K. CLEMENS  3,109,463
DISPENSING NOZZLE WITH GREASE FITTING RECEIVING MEANS
Filed Feb. 19, 1960  2 Sheets-Sheet 1

INVENTOR.
FRED K. CLEMENS
BY
ATTORNEY

INVENTOR.
FRED K. CLEMENS
BY *William J. Miller*
ATTORNEY

_United States Patent Office_ 3,109,463
Patented Nov. 5, 1963

3,109,463
DISPENSING NOZZLE WITH GREASE FITTING
RECEIVING MEANS
Fred K. Clemens, Ponca City, Okla., assignor to Continental Oil Company, Ponca City, Okla., a corporation of Delaware
Filed Feb. 19, 1960, Ser. No. 9,786
1 Claim. (Cl. 141—360)

This application deals generally with a grease dispensing device and more particularly with a disposable grease dispensing can.

The usual method of hand dispensing grease has generally been from a hand operated grease gun which operates by a plunger or other suitable device which compresses grease by an amount sufficient to force the grease from the gun into a nozzle or other suitable device. The nozzle of the grease gun is clamped about a fitting designed to convey grease to a bearing or other device for lubricating processes. The hand operated devices have been generally of two types. The first type consists of a plunger which bears directly upon the grease within a suitably enclosed chamber. One of the main disadvantages of this gun is the difficulty experienced during refilling such a gun in that both the gun and the operator are generally subjected to an excessive amount of waste grease.

The second type of hand operated gun consists of a bag or other suitable device which is filled with grease. The bag is inserted within a specially designed grease gun such that pressure is brought to bear against the bag. The pressure against the bag will cause the grease to be expelled therefrom. As the grease is being expelled, the bag collapses. Both of these devices require the operator to retain at all times a fairly expensive grease gun. Due to the cost of the gun, it becomes impractical to maintain a sufficient amount of these grease guns available for a plurality of vehicles or other devices which require periodic greasing. Further, the loss or damage of grease guns becomes an important factor on farms or road crews or the like (where the guns must be kept on the equipment to be greased at all times). This is especially true of equipment that requires frequent greasing in order to maintain operability; for example, harvest equipment, such as combine or tractor.

Therefore, it is an object of this invention to provide a grease gun which costs little more than the grease contained therein.

It is a further object of this invention to provide a grease gun which is completely disposable.

It is a still further object of this invention to prevent the grease from being contaminated by any pressurizing device contained within the disposable container.

It is another object of this invention to provide a disposable grease dispenser wherein substantially all the grease may be dispensed without danger of the valve becoming clogged and plugged or the grease becoming trapped within an entangled dispensing bag.

It is a further object of this invention to disclose a novel disposable grease dispensing nozzle which will provide a tight seal around the grease fittings and simultaneously act as the grease releasing valve for the dispenser.

Other objects, features, and advantages of the invention will become apparent from the following description and claims when read in view of the accompanying drawings, in which:

Similar numbers will be used throughout all figures where common structural elements are shown.

Figures 1, 2:
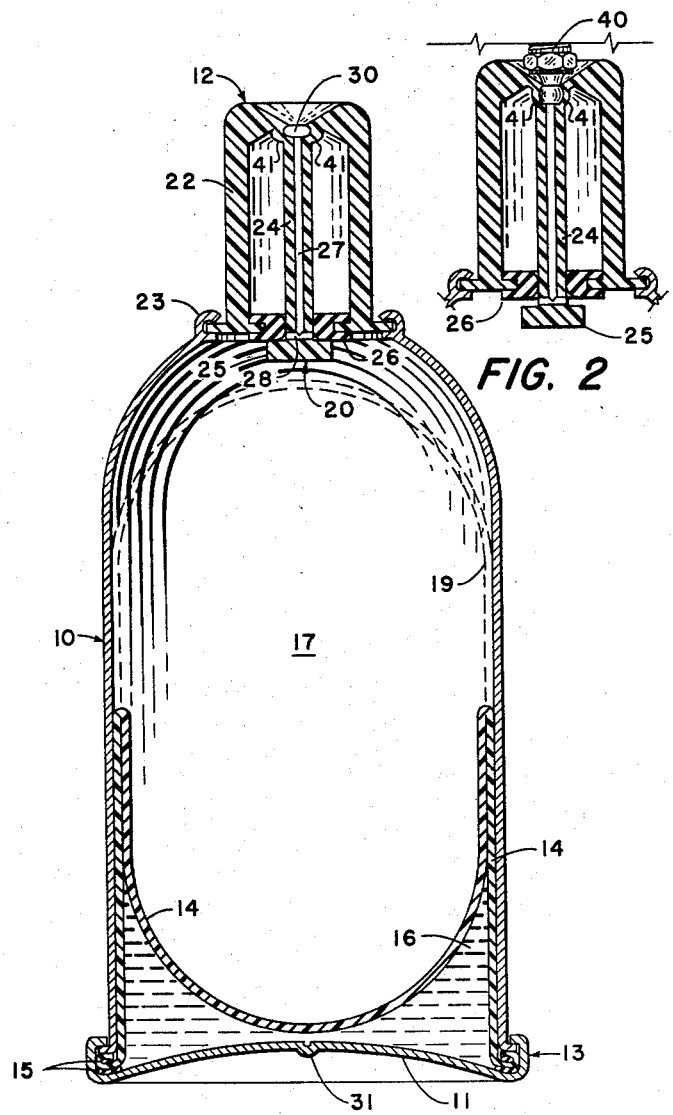
FIG. 1 is a drawing of a longitudinal cross-section of one embodiment of the disposable grease dispenser.
FIG. 2 is a cross-sectional view of the grease dispenser nozzle in the open position.

Referring to the drawings and in particular to FIG. 1, a metal can or container 10 has a concaved bottom 11 at one end and a grease dispensing nozzle 12 at the other end. Can 10 is of the usual high pressure design type. The seals, such as rolled joint 13, may be any well known structure suitable for maintaining the selected pressure within the can. In the preferred embodiment, joint 13 is modified by a pair of O rings 15 to enable a tight seal for joint 13 and prevent damage to a plastic bag 14 which is contained within can 10 and anchored between the O rings 15. Contained between bag 14 and bottom 11 is a suitable propellant 16. Propellants such as certain classes of Freon and carbon dioxide provide an adequate propellant to force the grease from nozzle 12. Contained between bag 14 and nozzle 12 is a suitable grease 17. A novel feature of this invention resides in the fact that propellant 16 rather than grease 17 is contained within plastic bag 14. When the propellant is placed within the bag rather than the grease, the problem of bag tangling and valve fouling has been completely eliminated. Thus, as the grease is expelled from nozzle 12, bag 14 inflates rather than deflates. Since bag 14 can only expand to the limits shown by dotted lines 19, the valve mechanism of nozzle 12 can not possibly become fouled.

Nozzle 12 consists primarily of an outer supporting cylinder 22, a grease fitting receiving cap 30, a valve stem 24, and a valve 20. Outer cylinder 22, which may be made of any suitable material such as plastic, is anchored into the top of can 10 by a suitable means, such as a flange 23. Rigidly attached to the bottom of valve stem 24 is valve head 25 which is seated against valve seat 26. A central duct 27 communicates with a transverse duct 28 at one end and grease fitting receiving means 30 at the other end. A novel feature of applicant's invention is the ellipsoidal structure of grease fitting means 30, which will be subsequentially described. Bottom 11 contains a filling hole 31 which permits a suitable propellant 16 to be inserted therethrough. Once propellant 16 is within the can, hole 31 is capped by any suitable means to prevent the propellant from escaping.

In operation, when a substantially round grease fitting 40 (see FIG. 2) is inserted into ellipsoidal grease fitting receiving means 30, the plastic walls 41 tend to deform into a spherical shape, tightly gripping grease fitting 40. The deformation of the walls 41 also causes stem 24 to be forced in a downward direction. The downward move of stem 24 causes valve head 25 to move away from valve seat 26. This will permit grease to enter transverse duct 28, travel up central duct 27, and into the hole provided in grease fitting 40. As the grease becomes expelled, the volume of grease contained within can 10 will become less. The decrease will cause a corresponding decrease in pressure against the plastic bag 14. Propellant 16 will then vaporize sufficiently to increase the pressure to a point where equilibrium is reached. Thus, as long as grease fitting 40 remains within the fitting receiving means 30, grease will be forced into fitting 40. When the grease fitting is removed, walls 41 will tend to return to their original ovate shape. The grease contained within can 10 will simultaneously force valve head 25 in an upward direction. Both walls 41 and valve head 25 will co-act to reclose the valve. When grease 17 within can 10 becomes fully expelled, can 10 may then be discarded.

Bag 14 may be made of any suitable material which is inert to the solution being dispensed. If, as in the preferred embodiment, the dispensing fluid is grease, bag 14 may be made out of many plastic films, some of which are as follows:

(1) Polychloroprene, which is sold under the trade name "Neoprene." This film is very suitable because of its resistance to hydrocarbons.

(2) Polyethylene terephthalate, which is sold under the trade name "Mylar" film and a coated product sold as "Scotchpak" film, particularly suitable because of its high strength and resistance to hydrocarbons.

(3) Both polychloroprene and polyethylene films are very suitable for ester-type synthetic lubricants.

(4) High density polyethylene films.

Figure 3:
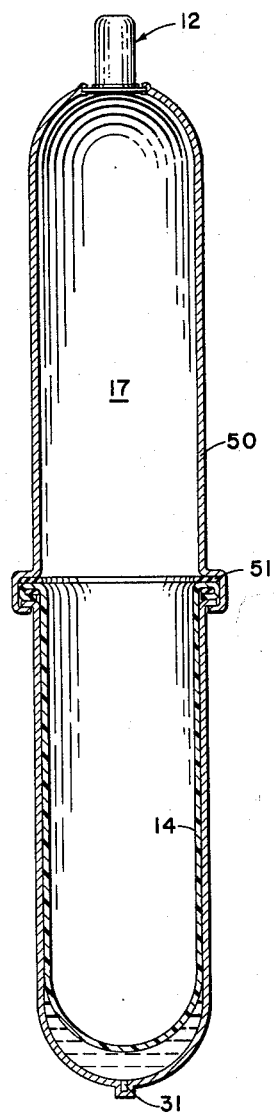
FIG. 3 is a longitudinal cross-sectional view of a second embodiment of the novel grease dispensing device.

FIG. 3 shows a method of attached film 14 at the center of the can 50. Joint 51 is similar in all respects to joint 13, and therefore, will not be described again. As in the case of FIG. 1, bag 14 is designed so that it will not foul grease dispensing nozzle 12. Since bag 14 is inflating rather than deflating, it will likewise not be faced with the serious problem of becoming trapped or pinched such that the dispensing material 17 will no longer be able to be expelled from nozzle 12. A feature of can 50 is that it will withstand higher pressures than can 10. Can 50 likewise has a propellant filling hole 31. The operation of FIG. 3 is in all respects similar to the operation described for FIG. 1.

Figure 4:
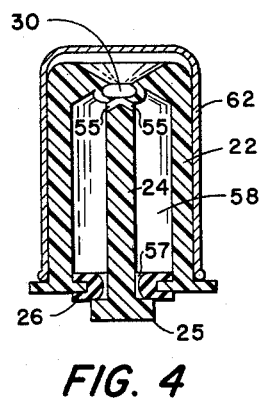
FIGS. 4 and 5 are cross-sectional views showing further modifications of the novel grease dispensing nozzle.

FIG. 4 shows another modification of the nozzle shown in FIGS. 1 and 2. However, the central duct 27 and transverse duct 28 have been removed and a plurality of diagonal ducts 55 have been inserted at the top of valve stem 24. Valve seat 26 is provided with a gap 57 between the valve seat and valve stem 24. This gap or clearance 57 will permit the dispensing fluid 17 to escape around stem 24 when valve head 25 is displaced. Dispensing fluid 17 will fill the inner chamber 58 with grease which will force grease through diagonal ducts 55.

Figure 5:
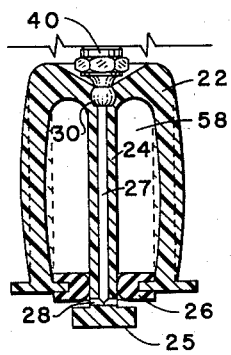

Referring to FIG. 5, a further modification of FIG. 1 is shown, wherein the inner chamber 58 has been thickened around grease fitting receiving means 30. Receiving means 30 may either be ellipsoidal as shown in FIG. 4 or circular. In FIG. 5, however, the prime method for moving valve stem 24 is by flexing walls 22. Since the valve in FIG. 5 is shown in an open position, the dotted lines will indicate the position of walls 22 when the valve is in a closed position. This embodiment has several advantages as follows:

(1) The valve will not be as susceptible as other dispenser valves to a side blow against walls 22 since the walls 22 are creating a strong tension in valve stem 24.

(2) Grease nozzle 12 may easily be made of all the same material on a simple injection mold or the like.

When the valve is closed, walls 22 will be substantially cylindrical. A cap 62, as shown in FIG. 4, may easily be inserted thereover. While the arrangement of ducts 28 and 27 are shown similarly to those of FIG. 1, it is obvious to one skilled in the art that other methods may be employed for conveying dispensing fluid 17 such as that shown in FIG. 4.

Although this invention has been described with respect to particular embodiments thereof, it is not to be so limited, as changes and modifications may be made therein which are within the spirit and scope of the invention as defined by the appended claim.

I claim:

A disposable grease dispensing nozzle adapted to receive a grease fitting at the output and adapted to be mounted on a dispensing can of the type containing grease as a product and a pressurizer as a propellant comprising:

(a) a cylindrical outer supporting means formed of yieldable material;

(b) a valve stem axially mounted therein;

(c) a yieldable ellipsoidal grease fitting receiving means mounted on one end of said valve stem and attached to one end of said outer supporting means;

(d) a valve including an annular valve seat member mounted on the other end of said outer cylinder and receiving the remaining end of said valve stem and a valve head attached to the remaining end of said valve stem, said valve head being in engagement with said valve seat;

(e) means for attaching said outer cylinder to said pressurized dispensing can; and (f) communicating means between said valve and said ellipsoidal grease fitting receiving means;

whereby insertion of a grease fitting into said ellipsoidal grease fitting receiving means causes said receiving means to form a tight seal around said grease fitting, such that when longitudinal pressure is applied to the end of the can, the sides of the outer supporting means will yield causing said valve to open permitting grease to pass from the inside of said can to said grease fitting.

References Cited in the file of this patent

UNITED STATES PATENTS

| | | |
|---|---|---|
| 1,930,040 | Crowley | Oct. 10, 1933 |
| 2,317,270 | Harris | Apr. 20, 1943 |
| 2,731,297 | Meyer | Jan. 17, 1956 |
| 2,815,152 | Mills | Dec. 3, 1957 |
| 2,839,225 | Soffer et al. | June 17, 1958 |
| 2,845,203 | Potash | July 29, 1958 |
| 2,889,078 | Thomas | June 2, 1959 |
| 2,892,575 | Turk | June 30, 1959 |
| 2,918,936 | Dawson | Dec. 29, 1959 |
| 2,924,041 | Jackson | Feb. 9, 1960 |
| 2,924,359 | Beremand | Feb. 9, 1960 |

FOREIGN PATENTS

| | | |
|---|---|---|
| 827,090 | Great Britain | Feb. 3, 1960 |